Figure 1:
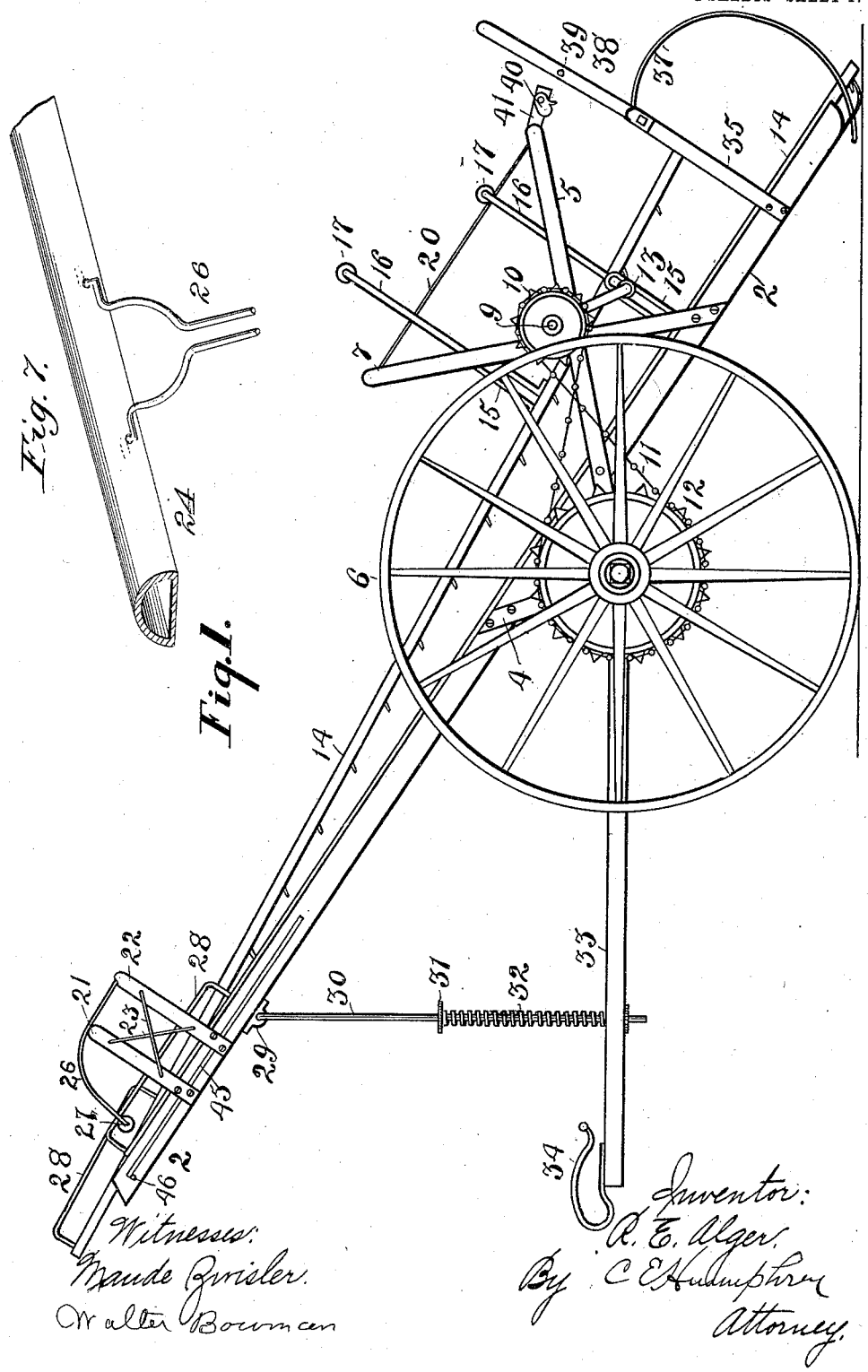

No. 748,032. PATENTED DEC. 29, 1903.
R. E. ALGER.
HAY LOADER.
APPLICATION FILED JUNE 10, 1903.
NO MODEL. 4 SHEETS—SHEET 1.

No. 748,032. PATENTED DEC. 29, 1903.
R. E. ALGER.
HAY LOADER.
APPLICATION FILED JUNE 10, 1903.
NO MODEL. 4 SHEETS—SHEET 2.

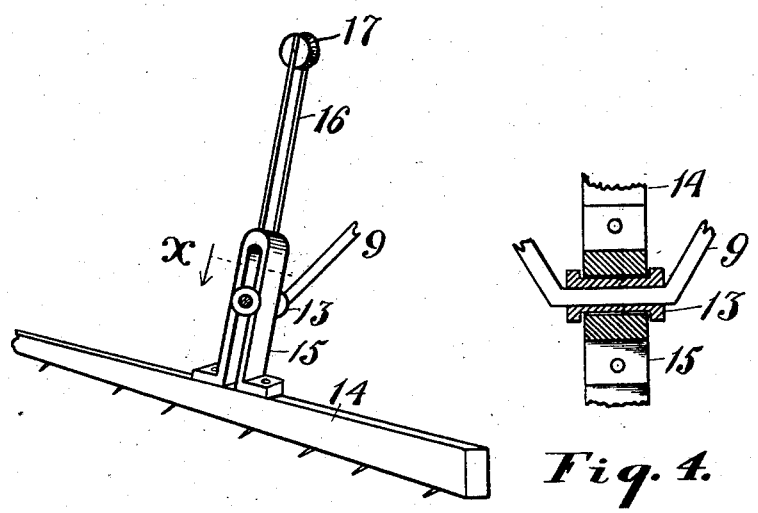
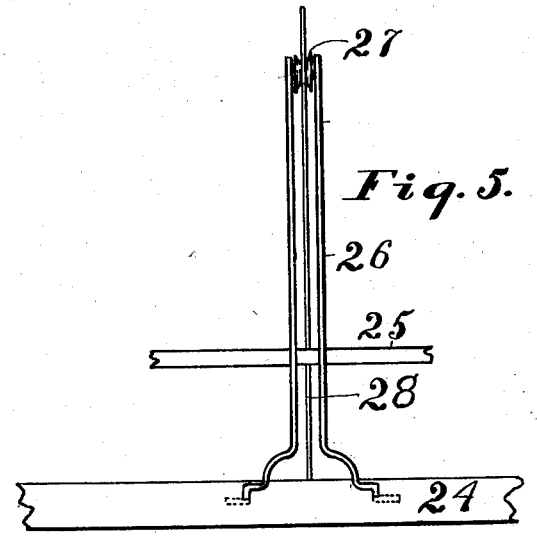

No. 748,032. PATENTED DEC. 29, 1903.
R. E. ALGER.
HAY LOADER.
APPLICATION FILED JUNE 10, 1903.
NO MODEL. 4 SHEETS—SHEET 4.

Witnesses:
Maude Zwisler,
Walter Bowman.

Inventor:
R. E. Alger.
By C. E. Humphrey
Attorney

No. 748,032. Patented December 29, 1903.

UNITED STATES PATENT OFFICE.

RICHARD E. ALGER, OF WEST RICHFIELD, OHIO.

HAY-LOADER.

SPECIFICATION forming part of Letters Patent No. 748,032, dated December 29, 1903.

Application filed June 10, 1903. Serial No. 160,797. (No model.)

*To all whom it may concern:*

Be it known that I, RICHARD E. ALGER, a citizen of the United States, residing at West Richfield, in the township of Richfield, in the county of Summit and State of Ohio, have invented a certain new and useful Improvement in Hay-Loaders, of which the following is a complete specification.

My invention pertains to hay-rakes of that general class in which the hay is propelled or forced upward over an inclined platform by alternately-reciprocating gangs of rake-bars, which are provided with teeth for that purpose and in which there are also teeth for raking and collecting the hay and drawing it onto the inclined platform and in which the gangs are operated by a multicrank-shaft or crank-shaft with cranks so disposed as to give a simultaneous longitudinal movement to all of the rake-bars of each gang of such rake-bars alternately with reference to the simultaneous movements of the rake-bars of its fellow gang or gangs. In this class of loaders mechanism is used which is adapted to pick up and elevate the hay directly from the swath to the wagon, and this mechanism is propelled and operated by being attached to a wagon upon which the hay is to be loaded.

Among the objects of my invention are to provide a simple, strong, and durable machine which by reason of its construction is particularly free from liability to choke or clog and which shall accomplish its work in a positive and clean manner under all circumstances, whether the hay be damp and heavy or light and fluffy.

Another object is to so construct the mechanism by which the rake-bars are supported and reciprocated that as little friction as possible will exist during the operation of the machine to the end that the strain upon the team drawing the wagon by which the loader is operated will be as light as possible consistent with the perfect operation thereof.
A further object is to provide such mechanism that the reciprocating rake-bars in their operation will have a longitudinal movement parallel with the floor of the inclined platform over which the hay is to be elevated of comparatively great length, and the balance of the stroke of the rake-bars when lifted from their position near this platform will be short and of a circulatory motion to the end that as much of the stroke of the rake-bars as possible may be utilized to lift the hay a comparatively great distance at each stroke.

A still further object is to provide means to be placed in the bottom of this elevating-platform, whereby the height of the elevation of the hay may be to a certain extent regulated to suit the various conditions ordinarily found in the use of hay-loaders.

To the accomplishment of the aforesaid objects my invention consists in the peculiar and novel construction, arrangement, and combination of the various parts hereinafter described and then specifically claimed, reference being had to the accompanying drawings, forming a part hereof.

Figure 2:
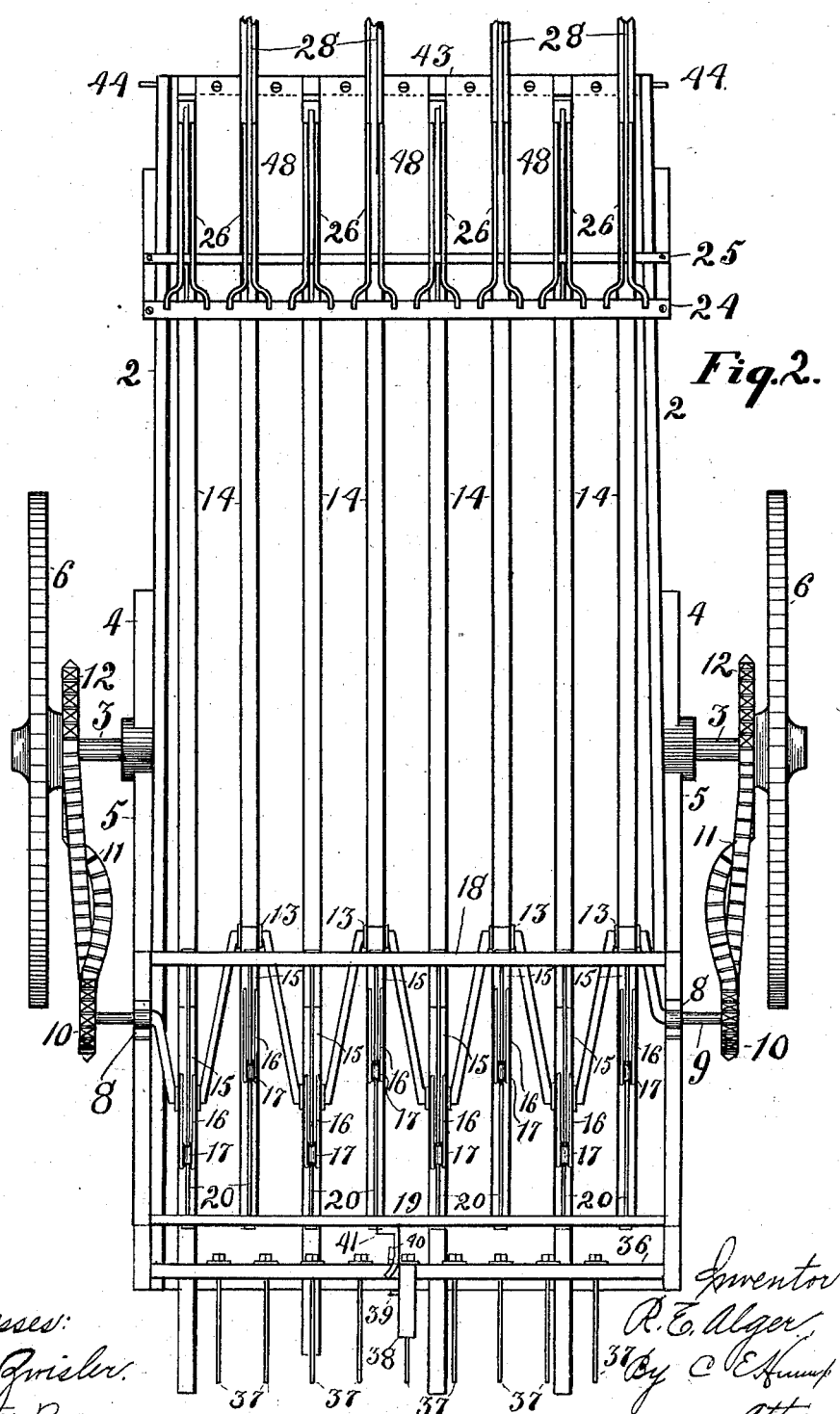
Figure 6:
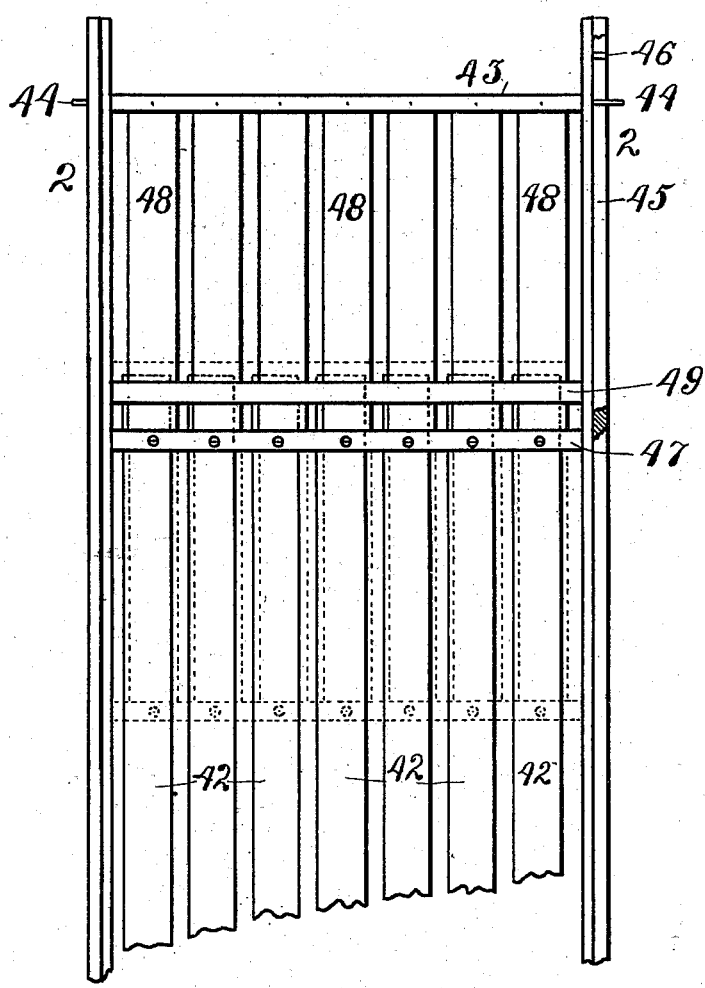

In the accompanying drawings, in which similar reference-numerals indicate like parts in the different figures, Figure 1 is a side elevation of my improved hay-loader in position for operation; Fig. 2, a plan thereof; Fig. 3, a perspective view of the mechanism by which the rake-bars are connected to the multicrank; Fig. 4, a section at the line $x$ of Fig. 3; Fig. 5, a plan view of the mechanism used to hold the upper and forward ends of the rake-bars from touching on the platform of the loader. Fig. 6 is an inverted plan of the bottom of the elevating-platform. Fig. 7 is a perspective view of the manner of hinging the mechanism or holding the front end of the rake-bars.

In the drawings, 1 is an inclined platform whose inclination is determined by the work to which it is to be adapted and the height to which the hay must be elevated. This platform is made up of longitudinal slats 42, slightly separated from one another to admit of the passage between them of fine chaff and other substances which it is not desirable to load upon the hay-wagon. At the upper end of this platform is a sliding gate, to be described later.

Along the sides of the platform 1 are two side pieces 2 2, firmly fastened to the platform 1. Transverse to the longitudinal length of the platform 1 and placed below it is an axle 3, which is connected to the platform 1 by side braces 4 5. On the ends of the axle 3 are supporting-wheels 6, on which the machine is adapted to run.

The braces 5 are attached to the side of the platform 1 and extend upwardly (see Fig. 1) a considerable distance. At about substantially right angles to the braces 5 and bisecting them at a determinate distance above the floor of the platform 1 are braces 7. Lying in the angles formed by the intersecting braces 5 7 are journal-boxes 8, in which boxes is mounted a multicrank 9, on the outer ends of which are sprocket-wheels 10, over which run sprocket-chains 11, which likewise mesh into larger sprockets 12 on the hubs of the wheels 6, by which motion is communicated from the wheels 6 to the multicrank 9. This multicrank consists of one integral shaft bent into a number of cranks—as, for instance, eight, as shown in the drawings—in which alternate cranks are diametrically oppositely disposed to each other.

In each of the crank portions of the multicrank is placed a friction-pulley 13 to lessen the friction during the operation of the machine. Immediately below each of these cranks are the rake-bars 14, which consist of long slender light rods, having in their under faces teeth of any preferred or desired configuration, the shape and style of which are immaterial in this invention. At a determinate point on each of the rake-bars 14 is placed an inverted-U-shaped housing 15, which is fastened by screws or otherwise to the upper face of the rake-bar. This inverted-U-shaped housing is adapted to inclose the friction-pulley 13 on the respective crank to which it is desired to attach it. From the upper part of the U-shaped housing 15 rise two upright rods 16, having mounted between their upper free ends a roller or trolley 17 for a purpose to be stated.

It will here be noted that the braces 5 7 exist on both sides of the inclined platform 1, and extending between each of the braces 7 7 is a transverse rod or bar 18, and extending between the braces 5 5 is a similar and parallel bar 19. Connecting the cross-bars 18 19 are a series of trolley-wires 20, and these wires are so placed as to stand immediately centrally above the cranks and the rake-bars 14. The uprights 16 are intended to straddle the trolley-wires 20 and the trolley 17 to run on the upper surface thereof, so as to limit the downward movement of the U-shaped housing 15, and as a consequence the rake-bars 14, so that as the trolley 17 rides along the upper face of the trolley-wires 20 the rake-bars may be held from contact and friction with the surface of the floor of the platform 1, and this distance of separation may be arbitrarily determined by the uprights 16 or the location of the trolley-wheel 17 in the uprights 16.

The upper or front ends of the rake-bars 14 are supported in the following manner: On both sides of the platform 1, near its upper end, arise two posts 21 22, united together by strengthening cross-pieces 23. Extending between the two posts 22 is a cross-bar 24, and extending between the uprights 21 extends a cross-bar 25. The cross-bar 24 is preferably made of thin hollow metal in substantially a semicircular form, and into this is inserted the two legs of a light metallic framework 26, which holds near its outer end a rotatable trolley 27, for a purpose to be stated. The feet of the framework 26 are intended to pierce the metallic top of the cross-bar 24 and then be outwardly bent, as indicated in Fig. 5 in dotted lines, thereby securely holding and pivoting this framework in position.

The downward movement of the framework 26 is limited by the transverse cross-bar 25, and this is the sole object of this cross-bar.

On the front end of each of the rake-bars 14 and parallel therewith is a trolley-rod 28, whose ends are downwardly turned and enter and are secured in the bars 14. These bars 28 are intended to pass between the sides of the metallic framework 26 and over the trolley 27, so that the bars 28 will ride on the upper faces of the trolleys 27, and thereby support the bars 14 from coming in actual contact with the floor of the platform 1.

On the lower side of the platform 1 is a bearing 29, from which depends a rod 30, provided with a collar 31, below which is a coiled spring 32, adapted to bear on the upper face of a tongue 33, projecting from the axle of the machine. This rod 30 is adapted to pass through the tongue 33, and as the weight on the platform 1 increases to compress the spring 32, and thereby cushion the movements of the inclined platform 1.

On the front of the tongue 33 is a hook 34, by which the machine is connected to the rear of an ordinary hay-wagon. Near the rear and lower end of the platform 1 and on each side thereof are upright posts 35, extending between which is a rotatable bar 36, mounted in said posts 35, to which are fastened ordinarily-constructed rake-teeth 37. The lower end of these rake-teeth are arranged to pass down below the rear of the lower end of the platform 1 and gather up the hay on the ground, and as the rake-bars 14 pass backward they gather the hay and carry it forward.

In the center of the bar 36 is an upright handle 38, having projecting from one side a pin 39. This pin 39 is intended and arranged to engage in the tooth of a pivotally-hung pawl 40, pivoted to the side of a horizontal arm 41, projecting from the rear of the cross-bar 19. The object of this lever 38, pin 39, and pawl 40 is that when it is desired to raise the rake-teeth 37 from contact with the ground for any purpose the lever 38 is thrown forward until the pin 39 gradually raises the pawl 40 sufficiently to permit the pin 39 to pass below it and pass the tooth projecting from its lower face. When this is done, the lever 38 is released, and the engagement of the pin 39 against the crotch situated between the tooth and the body of the pawl retains the lever 38 in position, together with the rake-teeth 37. When it is desired to release the rake-teeth, the lever 38 is pulled farther forward, allowing the pawl to drop down in the position shown in Fig. 1, and when lever 38 is released the pin 39 pushes the pawl out of the way and the lever 38 and the teeth 37 resume the position shown in Fig. 1, with their lower ends resting on the ground.

At the upper end of the elevating-platform there is a longitudinal extensible gate used to lower the point of discharge of hay from the loader, and is best shown in Fig. 6. It consists of a cross-piece 43, extending between the side rails 2 of the elevating-platform, having from each end projecting pins 44, which pass through slots 45 in the side rails 2, and these slots terminate at the upper ends in abruptly downwardly turned depressions 46, into which the pins 44 may enter, and thereby sustain the gate in an elevated position. Likewise extending between the rails 2 is a transverse bar 47, between which and the cross-bar 43 extend slats 48, running substantially parallel with the slats 42, forming the bottom of the inclined platform. The lower ends of these slats 48 pass under the upper end of the slats 42, and both are sustained in position by a fixed transverse cross-bar 49, rigidly attached to the side rails 2.

The cross-bars 43 47 of the gate act as stops to limit the motion of the gate by encountering when pushed in either direction the fixed cross-bar 49, so that the slats 48 play between the ends of the slats 42 and the transverse bar 49.

In the process of loading a wagon with hay if the platform extended as high as the gate is when in an extended condition the hay would be delivered at too high a point over the wagon and much would be lost in its fall onto the wagon by reason of its blowing sidewise; but with this device, the gate being lowered, the hay is delivered at a closer point to the upper surface of the wagon, consequently less hay is lost thereby, and as the load in the wagon gradually increases in volume the gate may be fully extended and hay delivered at the highest point capable with this device.

The operation of the machine is as follows: As hay is gathered up by the teeth 37 it collects on the face of these teeth and the rake-bars as they pass backward in their stroke gather the hay and carry it by alternate strokes up the incline and over the front of the platform 1. As just previously described, with the commencement of the delivery of the hay the slidable gate in the platform is lowered to permit the delivery of hay at the lowest point, and this gate is extended gradually as the load in the wagon increases. Should the hay become clogged or too thick at the upper end, the front ends of the rake-bars are permitted to rise by reason of the frames 26, on which are mounted trolleys 27, being free to rise upward until the trolley-rods 28 encounter the under faces of the cross-bars 24 25, which movement will allow any normal or reasonable amount of hay to pass thereunder. It will be noticed that the motion given by the multicrank to the rear ends of the rake-bars is a peculiar one, in that the rake-bars do not follow strictly the movement of the cranks, which is wholly rotary; but as the rods descend in their revolution the trolleys 17 ride upon and along the face of the trolley-wires 20, thereby holding the teeth from engagement with the face of the platform 1, and as the U-shaped housings 15 are vertically slotted sufficient play is afforded to the cranks to allow considerable horizontal movement to the rake-bars before the cranks again commence to lift the bars from proximity to the platform 1, and as the cranks, with their friction-pulleys, start to lift the housings 15 and rake-bars 14 in an upward direction the trolleys 17 are lifted from engagement with the trolley-wires 20 and continue in that elevated position until nearly the conclusion of the downward stroke of the cranks.

Having thus described my invention, what I claim, and desire to secure by Letters Patent, is—

1. The combination in a machine of the class designated of an inclined platform suitably mounted for transportation, a series of lengthwise-reciprocating rake-bars arranged to operate in close proximity to the floor of said platform, of a multicrank mounted above said platform, housings mounted on said rake-bars to suitably inclose said multicrank, mechanism connected with the transportation means for operating said multicrank, cross-bars mounted over the upper end of said platform, pivoted frames attached to one of said cross-bars provided with trolleys, longitudinal trolley-rods in the front of said rake-bars adapted to run on the upper surface of said trolleys and capable of vertical movement, substantially as shown and described.

2. The combination in a device of the class described provided with an inclined platform suitably mounted for transportation, of a series of rake-bars arranged to reciprocate in proximity to the floor of said platform, a multicrank mounted above said platform, means to operate said multicrank, slotted housings mounted on each of said rake-bars, each arranged to inclose one member of the multicrank, uprights extending from said housings provided at the top with a trolley, trolley-wires suitably mounted above said multicrank and placed to receive said trolleys on their upper surface, the trolleys being placed on said housings at such a distance above said rake-bars that when said trolleys are on said trolley-wires the teeth on said rake-bars will clear the floor of said platform.

3. The combination with a device of the class designated involving an inclined platform suitably mounted for transportation, of rake-bars arranged to reciprocate slightly above the surface of said platform, each of said rake-bars being provided with a housing mounted thereon provided with an overhead trolley, and a trolley-sustaining device, trolley-wires mounted above said platform to receive said trolley and means to reciprocate said rake-bars, substantially as shown and described.

4. The combination with a device of the class designated provided with an inclined platform suitably mounted for transportation, of a reciprocating rake-bar, a housing mounted thereon provided at its upper end with a trolley and trolley-support, a support for said trolley mounted above said platform to receive said trolley, a crank arranged to reciprocate above said platform, and in the housing on said rake-bar and a friction-reducing roller on said crank, substantially as shown and described.

5. The combination with a device of the class designated provided with an inclined platform, suitable means for the transportation thereof, of a multicrank-shaft each of the cranks thereon set in a direction opposite to its adjacent crank, each of said cranks provided with a friction-reducing means, a series of rake-bars arranged to reciprocate in proximity to said platform, housings on each rake-bar to inclose the friction-reducing means on said crank-shaft, a trolley and trolley-support on each of said housings, suitably-sustained trolley-supporting means above said crank-shaft arranged to receive said trolleys when said rake-teeth are at their lowest point during their reciprocatory movement, and means to operate said multicrank-shaft, substantially as shown and described.

In testimony that I claim the above I hereunto set my hand in the presence of two subscribing witnesses.

RICHARD E. ALGER.

In presence of—
C. E. HUMPHREY,
MAUDE ZWISLER.